United States Patent [19]

Matsumoto

[11] Patent Number: 5,245,701
[45] Date of Patent: Sep. 14, 1993

[54] METHOD AND SYSTEM FOR PROCESSING IMAGE DATA BASED ON PIXEL CHARACTERISTICS

[75] Inventor: Fuminari Matsumoto, Kanagawa, Japan

[73] Assignee: Fuji Xerox Co., Ltd., Tokyo, Japan

[21] Appl. No.: 595,808

[22] Filed: Oct. 10, 1990

[51] Int. Cl.$^5$ ............ G06G 15/62; G06F 3/14
[52] U.S. Cl. ........................... 395/129; 395/146
[58] Field of Search ............ 395/129, 165, 115, 144, 395/146

[56] References Cited

U.S. PATENT DOCUMENTS

| | | | |
|---|---|---|---|
| 4,403,261 | 9/1983 | Tanaka | 360/13 |
| 5,028,991 | 7/1991 | Sekizawa et al. | 358/75 |
| 5,122,953 | 6/1992 | Uekusa et al. | 395/146 |

Primary Examiner—Gary V. Harkcom
Assistant Examiner—Huynh Ba
Attorney, Agent, or Firm—Finnegan, Henderson, Farabow, Garrett & Dunner

[57] ABSTRACT

An image processing system receives different types of image data with different number of bits per pixel, stores the image data into a memory, and applies given image processing steps to the image data stored therein. A control device is included in the image processing system. The control device determines the positions of pixels to be image processed, the number of pixels of one line, and the number of lines. For each line a least common multiple (LCM) of the number of bits of the pixel ($B_m$) and the number of bits per access of the image data used in the image processing system ($B_0$) is calculated, and the control device executes preset image processing programs under the determined conditions.

12 Claims, 6 Drawing Sheets

FIG. 6(A)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 16 | 17 | 18 | 19 | 20 | -- | -- | -- | -- | -- |  |  |  |  |  |  |
|  |  |  |  |  |  |  |  |  |  |  |  |  |  |  |  |
|  |  |  |  |  |  |  |  |  |  |  |  |  |  |  |  |
|  |  |  |  |  |  |  |  |  |  |  |  |  |  |  |  |

FIG. 6(B)

| 0 $B_0$ | 0 $B_1$ | 0 $B_2$ | 1 $B_0$ | 1 $B_1$ | 1 $B_2$ | 2 $B_0$ | 2 $B_1$ | 2 $B_2$ | 3 $B_0$ | 3 $B_1$ | 3 $B_2$ | 4 $B_0$ | 4 $B_1$ | 4 $B_2$ | 5 $B_0$ |
|---|---|---|---|---|---|---|---|---|---|---|---|---|---|---|---|
| 5 $B_1$ | 5 $B_2$ | 6 $B_0$ | 6 $B_1$ | 6 $B_2$ | -- | -- | -- | -- | -- | -- | -- |  |  |  |  |
|  |  |  |  |  |  |  |  |  |  |  |  |  |  |  |  |
|  |  |  |  |  |  |  |  |  |  |  |  |  |  |  |  |

FIG. 8(B)

| 0 | 0 | 0 | 0 | 0 | 0 | 0 | 0 | 0 | 0 | 0 | 0 | 47 B0 | 47 B1 | 47 B2 |
|---|---|---|---|---|---|---|---|---|---|---|---|---|---|---|

FIG. 8(C)

| 42 B2 | 43 B0 | 43 B1 | 43 B2 | 44 B0 | 44 B1 | 44 B2 | 45 B0 | 45 B1 | 45 B2 | 46 B0 | 46 B1 | 46 B2 | 0 | 0 |
|---|---|---|---|---|---|---|---|---|---|---|---|---|---|---|

FIG. 8(D)

| 74 B2 | 75 B0 | 75 B1 | 75 B2 | 76 B0 | 76 B1 | 76 B2 | 77 B0 | 77 B1 | 77 B2 | 78 B0 | 78 B1 | 78 B2 | 0 | 0 |
|---|---|---|---|---|---|---|---|---|---|---|---|---|---|---|

FIG. 8(E)

| 0 | 0 | 0 | 0 | 0 | 0 | 0 | 0 | 0 | 0 | 0 | 0 | 79 B0 | 79 B1 | 79 B2 |
|---|---|---|---|---|---|---|---|---|---|---|---|---|---|---|

METHOD AND SYSTEM FOR PROCESSING IMAGE DATA BASED ON PIXEL CHARACTERISTICS

BACKGROUND OF THE INVENTION

1. Field of the Invention

The present invention relates to an image processing method for storing image data and more particularly to an image processing method in which image data is serially stored into a memory.

2. Description of the Related Art

In prior image processing systems, various types of image data, such as data of images on documents read by an image reader, image data as generated by personal computers (PC), and image data as received by facsimiles are appropriately processed and output in the form of a hard copy from an image output device. An arrangement of the image processing system is shown in FIG. 4.

In FIG. 4, a page memory 40, which temporarily stores image data, is used for various editing processes, such as "masking" for removing a part of an image, "trimming" for picking up only a part of an image, and "cut & paste" for cutting a specific image area out of a document and putting the image into a specific area on another document.

The image processing system shown in FIG. 4 includes PC 41, image read device 43, and facsimile machine 44, which can each generate digital image data, and the image output device 46. The image output device 46 is shared by the digital image data generating devices.

A PC 41 is provided which can typically have a keyboard and a pointing device (mouse) as input devices and a color CRT as an output device. Documents, figures, and tables are created using the PC 41. A bit mapping circuit 42 receives code data from the PC 41 and forms a bit map of the received code data.

Input image data can also be received from an image reader. An image reader 43 includes a line sensor typically constructed with CCDs, and a drive circuit. The image reader 43 outputs digital image data in which one picture element (pixel) consists of a preset number of bits.

Input image data also can be received from a facsimile machine. A facsimile machine 44 receives code data through a telephone line, such as code data specified by the CCITT, and converts it into image data.

An image output device 46 forms a hard copy output of the image by using the input image data from PC41, facsimile machine 44, or image read device 43. The image output device 46 is provided with a black developing unit, or if necessary, with a color developing unit.

A control device 45, which contains a microcomputer, controls in a supervisory manner the operations of the image processing system on the basis of controls at the user interface (abbreviated as UI, and not shown in FIG. 4), for example, by image processing the image data stored in the page memory.

In one case a copy job may be initiated at the UI and the corresponding image data generated by the PC 41 is outputted. The control device 45 transfers the image data as supplied from the PC 41, to the image output device 46. In this case, the data outputted from the PC 41, when it is bit map data, is directly applied to the image output device 46. When it is code data, it is applied to the bit mapping circuit 42 where it is converted into bit map data. The bit map data is then applied to the image output device 46.

In another case the copying job initiated at the UI may be to copy and output the image data as read by the image reader 43. The control device 45 receives the image data output from the image reader 43 and sends it to the image output device 46.

In the case where the job is to copy and output the image data received from the facsimile machine 44, the control device 45 transfers the image data as outputted from the facsimile 44 to the image output device 46. The facsimile decodes the received image data and converts it into bit map data.

When a mask edit instruction is given to mask a specific area in the image as read by the image read device, the control device 45 stores the image data from the image read device 43 into the page memory 40, stores it there, and then transfers the masked image data to the image output device 46. The same image processing steps are applied to the image data output from the PC 41 and the facsimile 44 if a mask edit instruction is given.

In the image processing system which handles the image data which as shown in FIG. 4, the number of bits of one pixel is not uniform. When the image data in which the number of bits is small is processed, only part of the page memory is used. In this case the system is not cost effective. The conventional page memory is based on a plane memory system. In the plane memory system, as shown in FIG. 5, the bits of the image data are stored into respective plane memories. For example, the least significant bit of the image data is stored in the least significant plane memory P0; the next bit Bl, in the plane memory Pl; and the most significant bit Bn, in the most significant plane memory Pn. When the image data output from the image reader 43 shown in FIG. 4 uses 3 bits for expressing one pixel, three plane memories of the page memory 40 are used. Where the page memory 40 stores the image data as derived from the image read device 43, the page memory is efficiently utilized. However, image data outputted from the bit mapping circuit 42 and from the facsimile machine 44 are the image data of two values, i.e., one bit for one pixel. Accordingly, when the page memory 40 stores such image data, only the least significant plane memory P0 of the page memory 40 is used, while the remaining plane memories are not used. In this respect, the cost effectiveness is not good.

There has been proposed another storing system in which image data is serially stored into a single plane memory (referred to as a serial memory system). In the serial memory system, as shown in FIG. 6(A), the image data of one bit for one pixel is stored in the following way. A value of the 0-th pixel as designated by "0" is stored in a memory location at a first address. A value of the first pixel as designated by "1" is stored in a memory location at a second address. A value of the second pixel as designated by "2" is stored in a memory location third address. Values of the subsequent pixels are stored into the memory locations of the subsequent addresses. In storing the image data of 3 bits for one pixel, as shown in FIG. 6(B), the least significant bit $B_0$ of the 0-th pixel as designated by "0" is stored in the first address. The next bit $B_1$ of the same pixel is stored into the memory location at the next address. The most significant bit $B_2$ is stored in the memory location of the next address. In this way, three bits $B_0$, $B_1$, and $B_2$ of each pixel are serially stored in the address.

As described above, when the page memory comprises a serial pack storing system, it can effectively be used irrespective of the number of bits per pixel in the image data. Accordingly, the cost performance of the page memory can be improved.

In FIG. 6(B) showing a memory space of the page memory as "$5B_0$" indicates that the bit $B_0$ of the fifth pixel is stored in the memory location at that address. The same is true for storage of other image data.

However, in the image processing system which employs the serial pack storing system for storing image data into the page memory, image processing in the memory space of the page memory is complicated and time consuming. This will be described by using as an example the edit instruction for "cut & paste".

The "cut & paste" edit is an image processing routine to place an image within a rectangular area 54 as defined by two points $Q_3(x_3, y_3)$ and $Q_4(x_4, y_4)$ of a second image 52, into a rectangular area 53 as defined by two points $Q_1(x_1, y_1)$ and $Q_2(x_2, y_2)$ of a first image 51, as shown in FIG. 7. For easy understanding, it is assumed here that $x_1=x_3$, $x_2=x_4$, $y_1=y_3$, and $y_2=y_4$, and that the rectangular areas 53 and 54 are each between the $y_1$th and $y_2$th lines and each include the pixels between the 47th pixel and the 78th pixel. For purposes of this example, it is assumed that the image data is designed such that one line consists of 4752 pixels and one pixel consists of 3 bits, and that the number of bits per access of the control device 45, viz., the number of bits of the data that the control device 45 can obtain through one time access, is 16 bits (constitutes one word). In the description to follow, the "cut & paste" image routine uses image data transferred to the memory space of the page memory.

It is assumed now that image data of a first image is written into a given memory area A in the page memory 40, and image data of a second image is written into another memory area B in the page memory 40, as shown in FIG. 8(A) (for simplicity only a single memory area is shown), in this case, the state "1" means the function, namely, the state "1" represents the pixel in black.

Under this condition, the control device 45 first fetches the image data of the 8-th word which corresponds to the $y_1$th line in the memory area B. The image data to be transferred is the image data of the 47th and subsequent pixels. Accordingly, the control device 45 prepares the following data

0000000000000111.

The control device 45 logically multiplies the prepared data and the image data as previously fetched, which corresponds to the $y_1$th line in the memory area B, so that data of $42B_2$ to $46B_2$ are all set to "0", as shown in FIG. 8B.

Then, the control device 45 fetches the image data of the 8-th word at the address corresponding to the $y_1$th line in the memory area A, and prepares the following data

1111111111111000.

The control device 45 logically multiplies the prepared data and the image data as previously fetched, which corresponds to the $y_1$th line in the memory area A, so that unnecessary image data of $47B_0$, $47B_1$, and $47B_2$ are all set to "0", as shown in FIG. 8C. Then, the control device 45 logically sums items of image data as shown in FIGS. 8(B) and 8(C), and stores the result of the logical sum into the memory location of the 8th word corresponding to the $y_1$th line in the memory area A.

Then, the control device 45 reads out the data of the 9th word at the address corresponding to the $y_1$th line in the memory area B, and then writes the read data into the memory location of the 9th word at the address corresponding to the $y_1$th line in the memory area A. This operation is repeated up to the 13th word.

Subsequently, the control device 45 reads out the data of the 14th word at the address corresponding to the $y_1$th line in the memory area B, and sets the unnecessary bit or bits to "0", as previously stated with reference to FIG. 8(D). Next, the control device 45 reads out the data of the 14th word at the address corresponding to the $y_1$th line in the memory area A, and sets the unnecessary bit or bits to "0", as previously stated with reference to FIG. 8(E). Then, the control device 45 logically sums those items of image data, and stores the result of the logical sum into the memory location of the 14th word corresponding to the $y_1$th line in the memory area A.

Consequently, the image data from the 47th pixel to the 78th pixel on the $y_1$th line in the memory area A is replaced by the image data of the second image. The above sequence of operations is repeated up to the $y_2$th line, to complete the image processing of the "cut & paste" edit.

When the serial pack storing system is used as described above, image data not required for the image processing is inevitably read out. Accordingly, the unnecessary data must be masked on every line and this impairs speed performance of the image processing.

SUMMARY OF THE INVENTION

Accordingly, an object of the present invention is to provide a method for processing image data which improves the efficiency and therefore the cost performance of the page memory, and increases the image processing speed.

Additional objects and advantages of the invention will be set forth in part in the description which follows and in part will be obvious from the description, and may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, is the method of processing image data in a system which receives different types of image data with different numbers of bits per pixel, stores the image data into a memory, and processes the image data following the steps of determining the position of pixels to be image processed for an edit function; determining the number of bits in one line of the image to be processed, calculating for each line the least common multiple (LCM) of the number of bits of the pixel and number of bits per access of the image data by the image processing system and using the LCM to access and process only image data necessary to the edit function.

With such an arrangement, for the image processing in the memory space of the page memory, there is no need for the processing of the part of the image data which in the conventional image processing system requires a masking step for removing the transferred, unnecessary image data.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIGS. 6(A) and 6(B) is a diagram schematically showing a page memory of the serial pack storing type;

FIGS. 8(A)-(E) show schematic diagrams useful in explaining the transfer of image data in the image processing of a "cut & paste" edit.

DETAILED DESCRIPTION OF THE PREFERRED EMBODIMENTS

A preferred embodiment of an image processing system according to the present invention will now be described in more detail with reference to the accompanying drawings.

Figure 1:
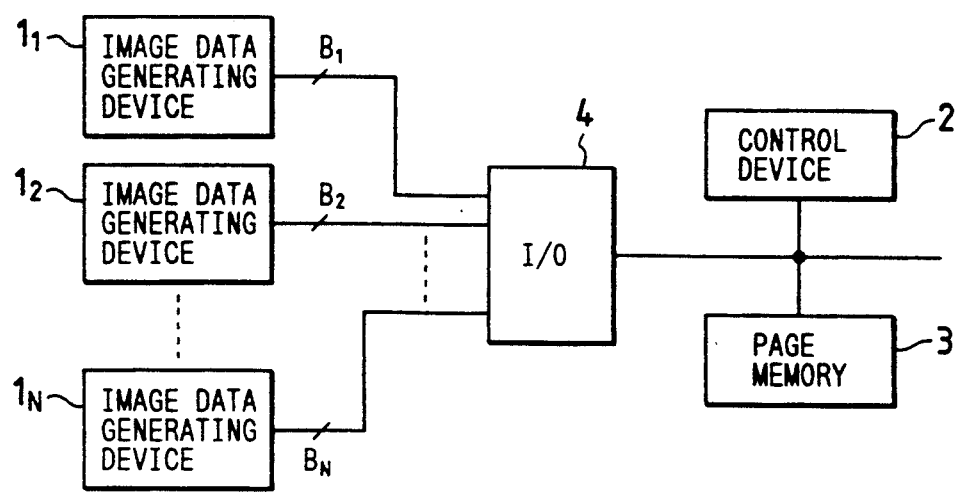
FIG. 1 is a block diagram showing a scheme of an image processing system according to a first embodiment of the present invention.

An image processing system according to the present invention, as shown in FIG. 1, comprises a plurality of image data generating units $1_1$ to $1_N$, a control device 2 for executing preset image processing programs and controlling the operations of the image processing system in a supervisory manner, and a page memory 3 for temporarily storing fetched image data in which the page memory is a serial pack storing system. Reference numeral 4 indicates an I/O interface. The image output device, which for instance could be a printer, is not essential to the invention, and hence is not illustrated in FIG. 1.

The control device 2 determines at least the positions of bits corresponding to the image and the number of bits of one line for each least common multiple (LCM) of the number of bits of the pixel and the number of bits per access of the image data (word) used in the image processing system, and executes a preset image processing program under the determined conditions.

Let us consider a case where the control device 2 fetches image data as generated by the image data generating unit $1_m$ and writes it into the page memory 3, and executes a preset image processing program, e.g., the "cut & paste" edit, in a memory space of the page memory 3. In this case, it is assumed that the image data outputted from the image data generating unit $1_m$ has the structure of $B_m$ bits for one pixel, and the number of bits per access of the image data in the image processing system is $B_o$ bits. The control device 2 first selects the number of bits of one line to be a multiple of the least common multiplier (LCM) of $B_m$ and $B_o$, and executes a preset image processing program under the determined conditions. Further, the control device 2 determines an area to be image processed for the "cut & paste" edit, and the number of bits to be transferred from the second image to the first image as related to the LCM of the $B_m$ and $B_o$.

Figure 2A:
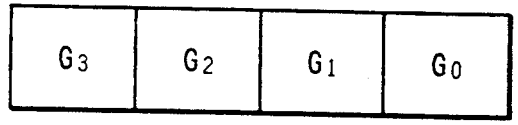
FIGS. 2(A), (B) and (C) are diagrams showing several formats of image data.
Figure 2B:
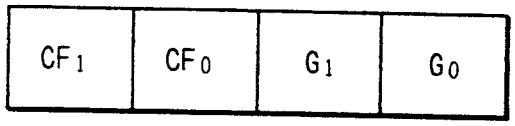
Figure 2C:
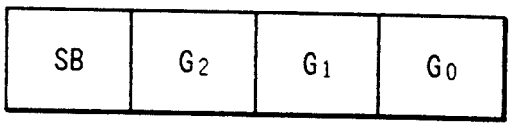

The image data outputted from the image data generating unit 1 may take various formats. If the image data from the image data generating unit 1 has the structure of 4 bits for one pixel, all the four bits may be used for expressing gradation data G, as shown in FIG. 2(A). Alternatively, the four bits may be used for expressing gradation data $G_0$ and $G_1$, and a color flag $CF_0$ and $CF_1$ showing color data of the pixel, respectively (FIG. 2(B)). If required, 3 bits may be used for the gradation data, and 1 bit for the color flag. Further, three bits may be used for the gradation data $G_0$, $G_1$, and $G_3$, and one bit may be used as an attribute bit SB indicative of the attribute of the pixel, for example, photograph of the image containing that pixel (FIG. 2(C)). These data format structures may also be appropriately combined.

Figure 3:
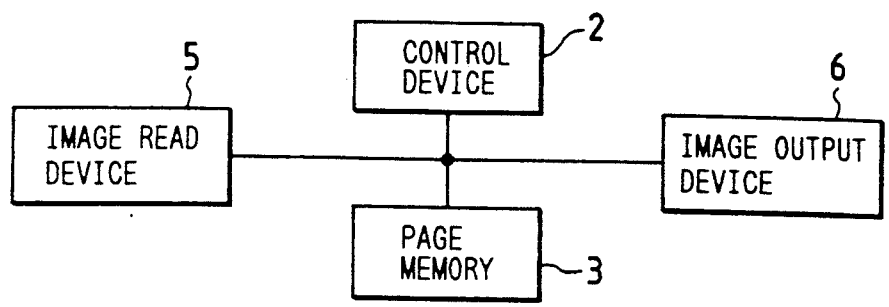
FIG. 3 is a block diagram showing an image processing system according to another embodiment of the present invention.
Figure 4:
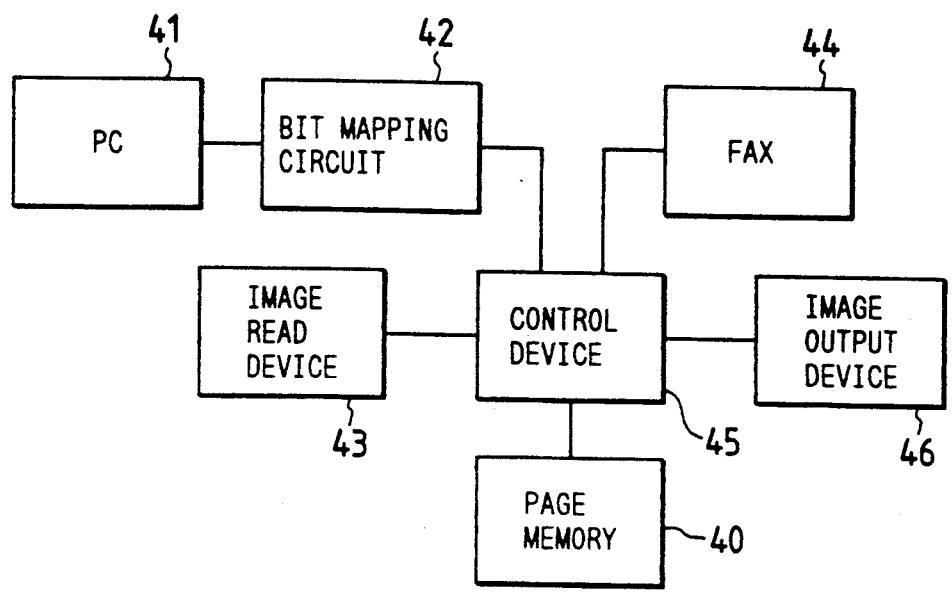
FIG. 4 is a block diagram showing an arrangement of a conventional image processing system.
Figure 5:
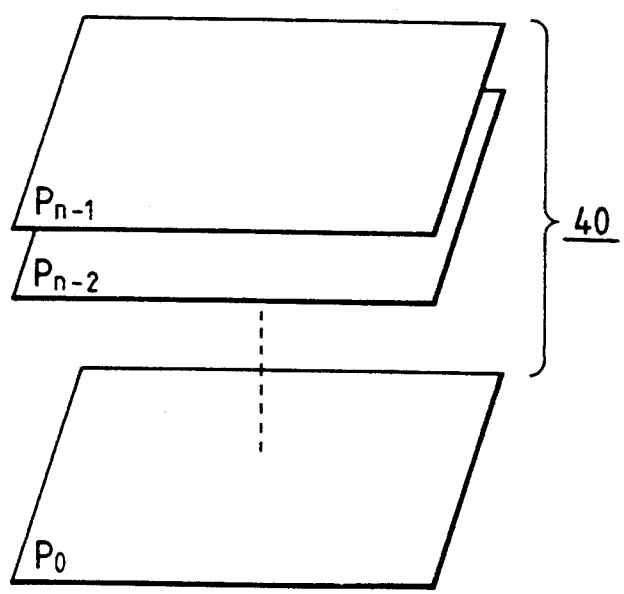
FIG. 5 is a diagram schematically showing a page memory of the, plane memory type.

For simplicity of explanation, the generalized image processing system of FIG. 1 is shown as the specific arrangement of FIG. 3 in which a single image read device 5 is used for the image data generating device. Further, the image data output from the image read device 5 includes only gradation data. The structure of the image data is 3 bits for one pixel. The number of bits per access of the image data in the image processing system is 16 bits. In FIG. 3, reference symbol 6 indicates an image output device.

The control device 2 determines at least the positions of bits corresponding to the image, and the number of bits of one line, by the least common multiple (LCM) of the number of bits of the pixel ($B_m$) and the number of bits per access of the image data ($B_o$) used in the image processing system, and executes a preset image processing program under the determined conditions.

The operation of the control device 2 will be described by using as an example how the "cut & paste" edit program operates.

As described above, 3 bits are used for expressing one pixel and the number of bits per access (word) of the image data in the image processing system is 16 bits. Therefore, the least common multiple of them is 48. The control device 2 first selects the number of bits of one line to be a multiple of 48. Accordingly, the image data of the largest number of pixels as a multiple of 48 is selected from the image data outputted from the image read device 5, and is written into the page memory 3. In case where one line contains 4752 pixels, all of the pixels of one line of the image data outputted from the image read device 5 are written into the page memory 3, since 4752×3 is a multiple of 48. In case where one line contains 4641 pixels, the number is rounded to a value as a multiple of 48 by the pixel selection because 4641×3 is not a multiple of 48. In this case, 4640 pixels are selected from the 4641 pixels and written into the page memory 3. The image data of 1 pixel is neglected. Practically, however, the neglect of such image data is negligible because if the image read device 5 reads an image on a document at 400 dot/inch, only 0.06 mm is neglected.

The number of pixels and the number of lines of the image data when it is written into the page memory 3 can readily be counted by counters.

In this way, the control device 2 fetches two images from the image read device 5, and writes them into the page memory 3. Then, it executes the image processing "cut & paste" edit routine as instructed from the UI (not shown).

Figure 7B:
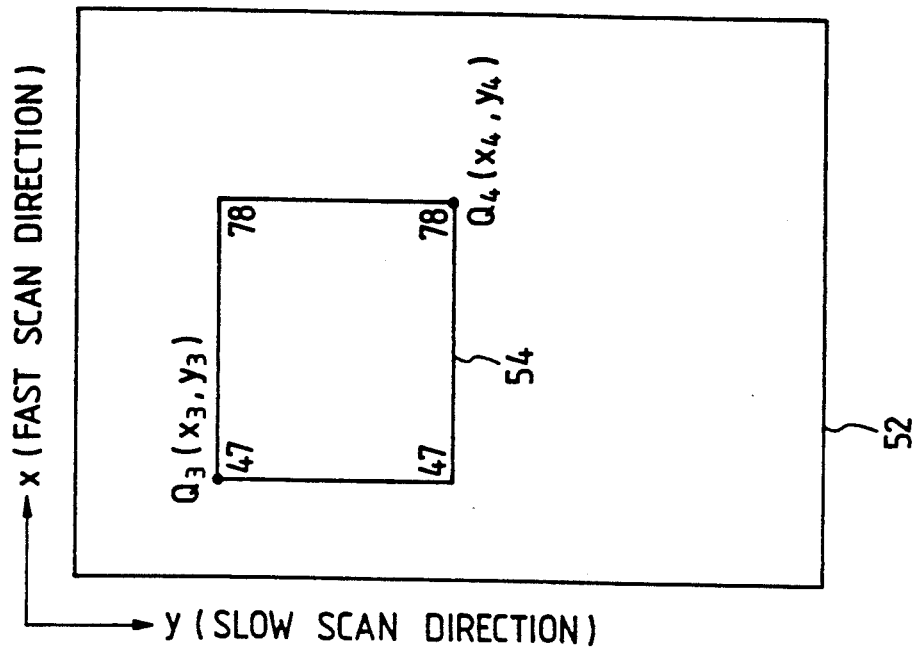
FIG. 7 shows schematically the image data process of a "cut & paste" edit.
Figure 7A:
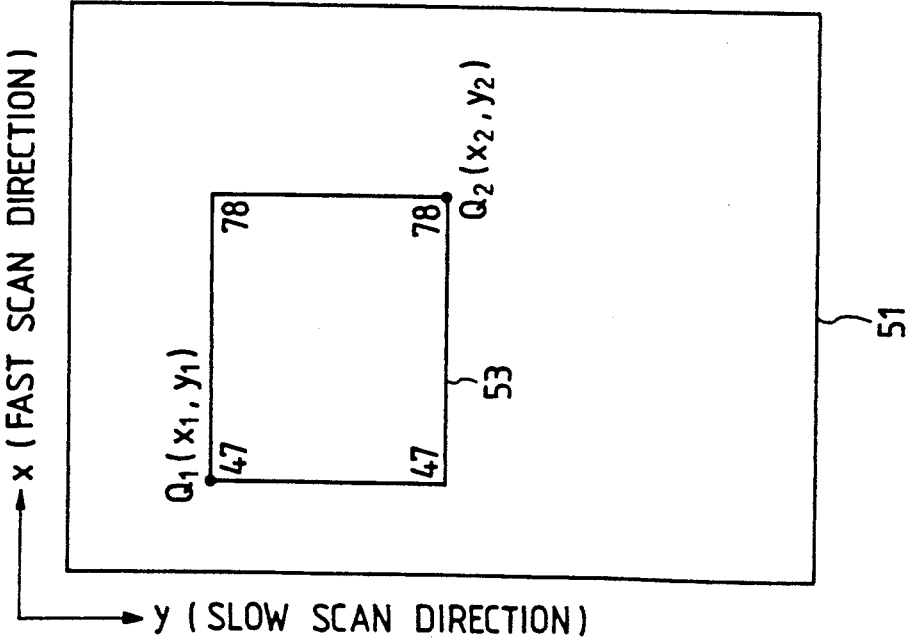

It is assumed that the control device 2 determines that an area to be subjected to the "cut & paste" edit processing as defined by a range between the 47th pixel and the 78th pixel in the main scan (or fast scan (FS)) direction and a range between the $y_1$th and $y_2$th lines in the vertical scan (or slow scan (SS)) direction, in the case of FIG. 7. Then, the control device 2 rounds the value of three times the coordinate in the fast scan direction in the area to be subjected to the "cut & paste" edit processing to be a multiple of 48. More specifically, the control device 2 checks if the x-coordinate ($x_1 \times 3$), a start point of the area, is a multiple of 48. If it is a multiple of 48, the coordinate value is used. If it is not a multiple of 48, a value that is a multiple of 48 and closest to the $x_1$ is used. Accordingly, in this case, 48 is used as the $x_1$. Then, the control device 2 checks if the width of the area as viewed in the x-direction, $(x_2-x_1+1)\times 3$, is a multiple of 48. If it is a multiple of 48, the value of the width is used. If not, the control device 2 selects $x_2$ so that $(x_2-x_1+1) \times 3$ is a multiple of 48. In this case, $$x_2 - x_1 + 1 = 78 - 48 + 1 = 31.$$

The number $31 \times 3$ is not a multiple of 48. Then, the control device 2 puts 79 in $x_2$. Then, $$x_2 - x_1 + 1 = 79 - 48 + 1 = 32.$$

Through the above sequence of operations, the control device 2 sets to a multiple of 48 the image processing start coordinate and the number of pixels to be image processed, both being viewed in the x-direction (FS direction). In this instance, 32 pixels between $x_1(=48)$ and $x_2(=79)$ are transferred.

Figure 8A:
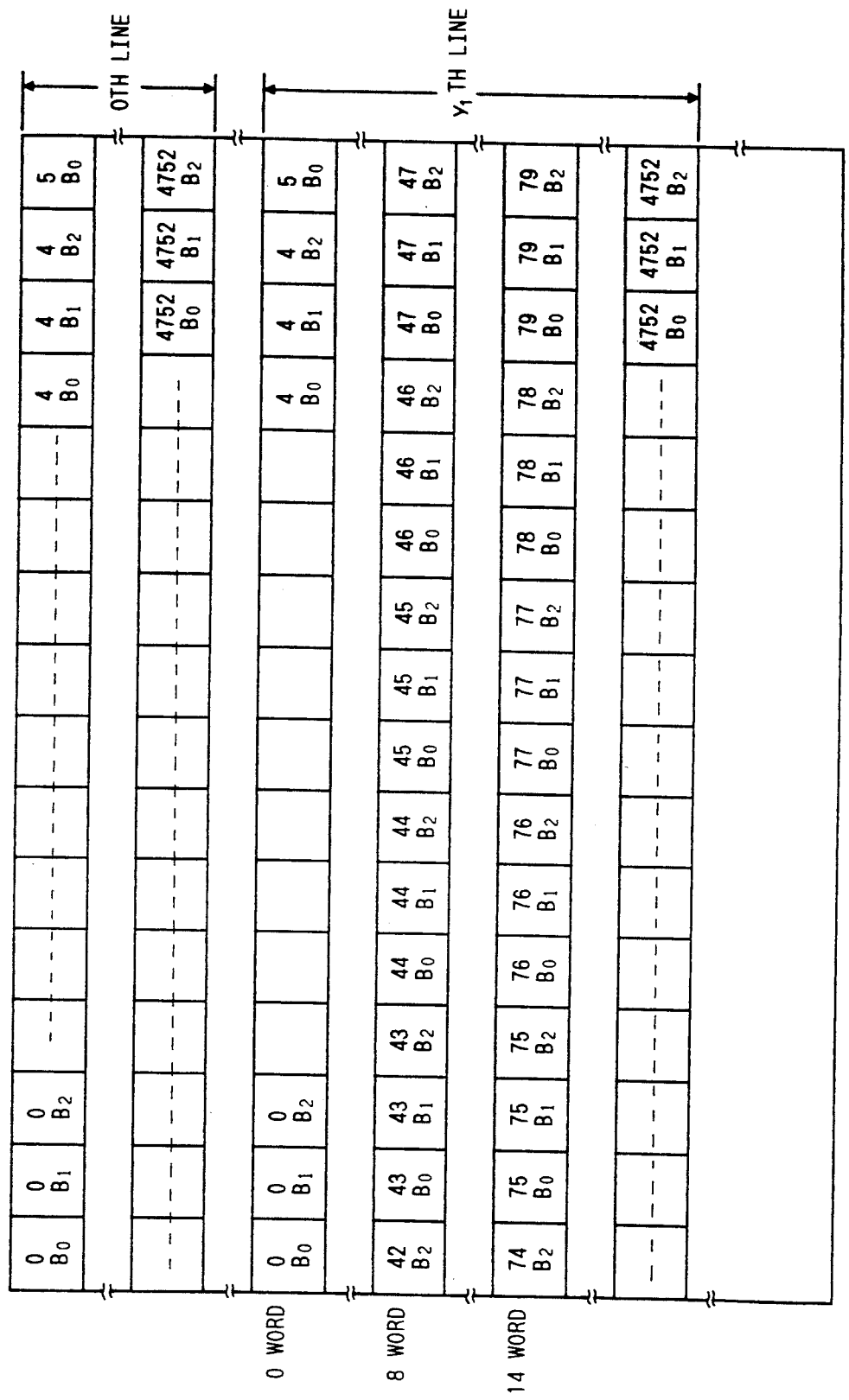

As seen from FIG. 8(A), the 9th word at the address corresponding to the $y_1$th line in the area of the page memory 3, where the second image is stored, starts from the image data of the 48th pixel. The 17th word terminates at the image data of the 95th pixel. In this instance, the control device 2 simply transfers the image data from the 9th word to the 14th word at the address corresponding to the $y_1$th line which is contained in the memory area storing the second image, to the area from the 9th word to the 14th word at the address corresponding to the $y_1$th line in the area storing the first image. This data transfer is repeated up to the $y_2$th line, to complete the "cut & paste" processing.

In this instance, the coordinate at which the image processing of the x-direction starts is displaced by one pixel. The coordinate at which the image processing terminates is displaced by 1 pixel. The displacement of the coordinates results in displacement of about 0.06 mm in the reproduced image. The amount of 1 mm is negligible in practical use. To be more specific, an area to be image processed is set on the CRT display, edit pad, or the like. In entering the coordinates, approximate positions, not pixels, are designated. Even if the pixel positions and the area width in the image processing are displaced or changed within a tolerable range, such displacement and change are negligible visually.

The image data is thus processed and transferred to the image output device 6. The image output device 6 then produces a copy with a "cut & paste"edited image.

While a specific embodiment of an image processing system according to the present invention has been described, it should be understood that the present invention is not limited to the above-mentioned embodiment, but may variously be changed and modified within the scope of the invention. In the embodiment, a single image data generating device is used, but a plurality of image data generating devices can be used. When the image data generating device is designated, the control device recognizes the number of bits of the image data as outputted from the image data generating device. Accordingly, the control device obtains the LCM of the number of bits of the image data and the number of bits per access of the data, and determines the data processing operation for each LCM.

In the embodiment thus far described, the control device transfers the image data from one memory area to the other within the page memory. If required, a DMAC (direct memory access controller) may be used for such data transfer. It is essential to the present invention that the image processing program is set for each LCM of the number of bits per pixel of the image data to be processed and the number of bits per access (word) of the data in the image processing system. Accordingly, when the image data is transferred, only the needed image data is transferred, without transferring unnecessary bits. As a result, the image processing speed is improved and hence the through-put of the image processing system is improved.

The foregoing description of preferred embodiment(s) of the invention has been presented for purposes of illustration and description. It is not intended to be exhaustive or to limit the invention to the precise form disclosed, the modifications and variations are possible in light of the above teachings or may be acquired from practice of the invention. The embodiment(s) were (was) chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A method for processing image data in an image processing system, the image processing system having means for receiving different types of image data, the image data including pixels having graphical coordinate positions and different numbers of bits per pixel, storing the image data into a memory, and performing an edit function on the stored data, initiating the edit function;

locating the graphical coordinate positions of pixels to be image processed by the edit function;

determining the number of bits in each line of the pixels to be image processed by the edit function;

calculating for each line of the pixels to be image processed by the edit function the least common multiple of the number of bits per; and adjusting the graphical coordinate positions of the pixels to be image processed in accordance with the number of bits in each line and the least common multiple so that the number of bits in each line equals a multiple of the least common multiple.

2. The method of claim 1 wherein the edit function is a cut and paste processing of the image data.

3. The method claim 1, wherein the edit function is a trimming processing of the image data.

4. The method of claim 1 wherein the edit function is a masking processing of the image data.

5. The method of claim 1 further including the step of outputting the processed image data.

6. The method claim 1 in which the bits per pixel include at least one bit indicative of density or reflectivity of said pixel.

7. The method claim 1 in which the bits per pixel include at least one bit indicative of color information of said pixel.

8. The method claim 1 in which the bits per pixel include at least one bit indicative of attribute information of said pixel.

9. An image processing system that receives different types of image data having different numbers of bits per pixel, that stores the image data into a memory in a plurality of memory areas, and that performs given image processing operations to the image data stored therein, said system comprising:

a user interface command device for selecting an image processing operation to be applies to specified image data stored in the memory at a predetermined memory area;

a control device for determining information from the specified image data and for performing the image processing operation selected by said user interface command device, wherein said control device determines said information from the specified image data in accordance with the least common multiple of the number of bits per pixel and the number of bits per access of the image data used in the image processing system.

10. An image processing system as claimed in claim 9, wherein the predetermined memory area corresponds to a determination of a position of pixels.

11. An image processing system as claimed in claim 9, wherein said predetermined memory area corresponds to a determination of number of bits per one line.

12. An image processing system as claimed in claim 9, wherein said memory corresponds to a one page memory.

* * * * *

UNITED STATES PATENT AND TRADEMARK OFFICE
CERTIFICATE OF CORRECTION

PATENT NO. : 5,245,701
DATED : September 14, 1993
INVENTOR(S) : Fuminari Matsumoto It is certified that error appears in the above-indentified patent and that said Letters Patent is hereby corrected as shown below:

Claim 3, column 8, line 63, before, "claim" insert --of--.

Claim 6, column 9, line 1, before, "claim" insert --of--.

Claim 7, column 9, line 4, before, "claim" insert --of--.

Claim 8, column 9, line 8, before, "claim" insert --of--.

Claim 9, column 9, line 17, change "applies" to --applied--.

Signed and Sealed this

Thirtieth Day of August, 1994

Attest:

BRUCE LEHMAN

*Attesting Officer*    *Commissioner of Patents and Trademarks*